United States Patent [19]
Harris

[11] Patent Number: 5,740,296
[45] Date of Patent: Apr. 14, 1998

[54] ADJUSTABLE TERMINAL HOUSING FOR OPTICAL FIBER

[75] Inventor: Laura Lee Harris, Eugene, Oreg.

[73] Assignee: Inwave Corporation, Eugene, Oreg.

[21] Appl. No.: 708,650

[22] Filed: Sep. 5, 1996

[51] Int. Cl.⁶ .................................................. G02B 6/06
[52] U.S. Cl. ............................ 385/116; 385/139; 385/901; 362/32
[58] Field of Search .................... 385/115–120, 139, 385/147, 901, 43; 362/32

[56] References Cited

U.S. PATENT DOCUMENTS

| | | | |
|---|---|---|---|
| 3,815,986 | 6/1974 | Darbee | 355/1 |
| 3,950,074 | 4/1976 | Tanaka | 385/116 |
| 3,962,702 | 6/1976 | Cuypers | 385/901 |
| 3,963,326 | 6/1976 | Buchert | 359/230 |
| 4,279,089 | 7/1981 | Murakami | 40/547 |
| 4,299,447 | 11/1981 | Soltan et al. | 385/116 |
| 4,777,571 | 10/1988 | Morgan | 362/32 |
| 4,780,798 | 10/1988 | Iida | 362/32 |
| 4,839,635 | 6/1989 | Harris et al. | 340/752 |
| 4,917,448 | 4/1990 | Oppenheimer | 350/96.1 |
| 4,929,048 | 5/1990 | Cuypers | 385/116 |
| 5,066,947 | 11/1991 | Du Castel | 340/815 |
| 5,129,032 | 7/1992 | Kawai | 385/901 |
| 5,295,216 | 3/1994 | Halter | 385/120 |
| 5,369,554 | 11/1994 | Erion | 362/31 |
| 5,375,045 | 12/1994 | Ruud et al. | 362/147 |
| 5,384,882 | 1/1995 | Shimamune et al. | 385/116 |
| 5,394,498 | 2/1995 | Hinterlong et al. | 385/115 |
| 5,400,424 | 3/1995 | Williams | 385/76 |
| 5,428,365 | 6/1995 | Harris et al. | 345/55 |
| 5,463,709 | 10/1995 | Terao et al. | 385/85 |
| 5,465,315 | 11/1995 | Sakai et al. | 385/116 |

FOREIGN PATENT DOCUMENTS

| | | | |
|---|---|---|---|
| 1380899 | 1/1975 | United Kingdom | G02B 5/16 |
| 9306584 | 4/1993 | WIPO | G09G 3/20 |

*Primary Examiner*—Rodney B. Bovernick
*Assistant Examiner*—Hemang Sanghavi
*Attorney, Agent, or Firm*—Stoel Rives LLP

[57] ABSTRACT

A lightweight display system (10) includes a display matrix (22) of output terminals (28) of optical conductors (30) supported on a preferably flexible substrate (16) by terminal housings (20). Each terminal housing (20) has a tubular neck (64) that curves away from its base (62) through a variety of angles. The curvature of the tubular neck (64) includes a full spectrum of angles employed to compensate for curvature occurring in any predetermined or unknown shape of a display screen (12). The necks (64) can be manually or machine cut at the appropriate position (132, 134, 136, 138) on the tubular neck (64) to compensate for the off-axis position of the base (62) with respect to the viewing axis. One embodiment is manufactured in halves (110) that can be joined together, and another embodiment includes friction bumps (69) to secure an optical conductor (30) within tubular neck (64). This low-cost means for directing output from an optical conductor (30) and particularly from an array of optical conductors (30) protruding from a nonplanar screen (122) preserves the quality of an image emitted from such a screen (122).

21 Claims, 6 Drawing Sheets

ADJUSTABLE TERMINAL HOUSING FOR OPTICAL FIBER

TECHNICAL FIELD

The present invention relates to large display screens and, in particular, to such screens having nonplanar emission surfaces for emitting varying alpha-numeric, graphic, or animated images to large audiences.

BACKGROUND OF INVENTION

Display systems based on coherent arrays of optical fibers have been developed to replace more cost/performance-limited conventional large display systems. The fiber-optic-based display systems can present static or animated images and are well suited for a variety of applications such as advertising and entertainment. These fiber-optic matrix displays offer significant advantages over other, more conventional displays that use light bulbs, LEDs, CRTs, flip disk type mechanisms, or projection systems. These advantages include, for example, lower weight, greater energy efficiency, superior color fidelity, and lower costs of manufacturing, transportation or delivery, operation, and maintenance.

Fiber-optic displays typically employ a source of illumination and an imaging medium such as film transparencies, motion picture film, or transmissive light-valve devices such as liquid crystal panels to generate source images. Light from the illumination source is directed through the imaging medium to an input matrix that holds input terminals of plural elongate optical conductors. The input terminals are mounted in closely packed rows and columns having relative positioning that corresponds with the relative positioning of spaced-apart rows and columns of output terminals of the optical conductors held in a much larger display matrix. Thus, the light delivered to the input terminals is carried along the optical conductors and delivered to the output terminals to form a display image having a greater size than the source image. One such display system is described in International Publication No. WO 93/06584, published on Apr. 1, 1993.

This publication also describes terminal housings for supporting the output terminals within the display matrix. The terminal housings are affixed to a planar or nonplanar substrate whose shape may be dictated by the shape of a screen support surface. The terminal housings are produced by heating a plastic disk until it is soft and pushing a blunt-ended probe, such as a drill blank, through the softened disk. The blunt-ended probe has the same diameter as that of an optical conductor. The tubular neck of each terminal housing is individually manufactured and, if appropriate, oriented to suit a desired viewing axis with respect to its base in response to predetermined curvature of the screen substrate. Accordingly, a variety of tubular neck portions may be required to accommodate the curvature of the screen substrate.

SUMMARY OF THE INVENTION

An object of the invention is, therefore, to provide a terminal housing having an output orienting means that can be modified to conform to a desirable viewing axis.

An advantage of the invention is that a single type of terminal housing can be manufactured and subsequently modified to suit any desirable viewing axis.

The invention relates to a terminal housing having a tubular neck that curves away from the base through a variety of angles. The curvature of the tubular neck includes a full spectrum of angles employed to compensate for curvature occurring in any predetermined or unknown display screen shape. The necks can be manually or machine cut at the appropriate position on the tubular neck to compensate for the off-axis position of the base with respect to the viewing axis. One embodiment of such a terminal housing is manufactured in halves that can be joined together around an optical conductor.

Additional objects and advantages of the present invention will be apparent from the following detailed description of preferred embodiments thereof, with reference to the accompanying drawings.

DETAILED DESCRIPTION OF PREFERRED EMBODIMENTS

Figure 1:
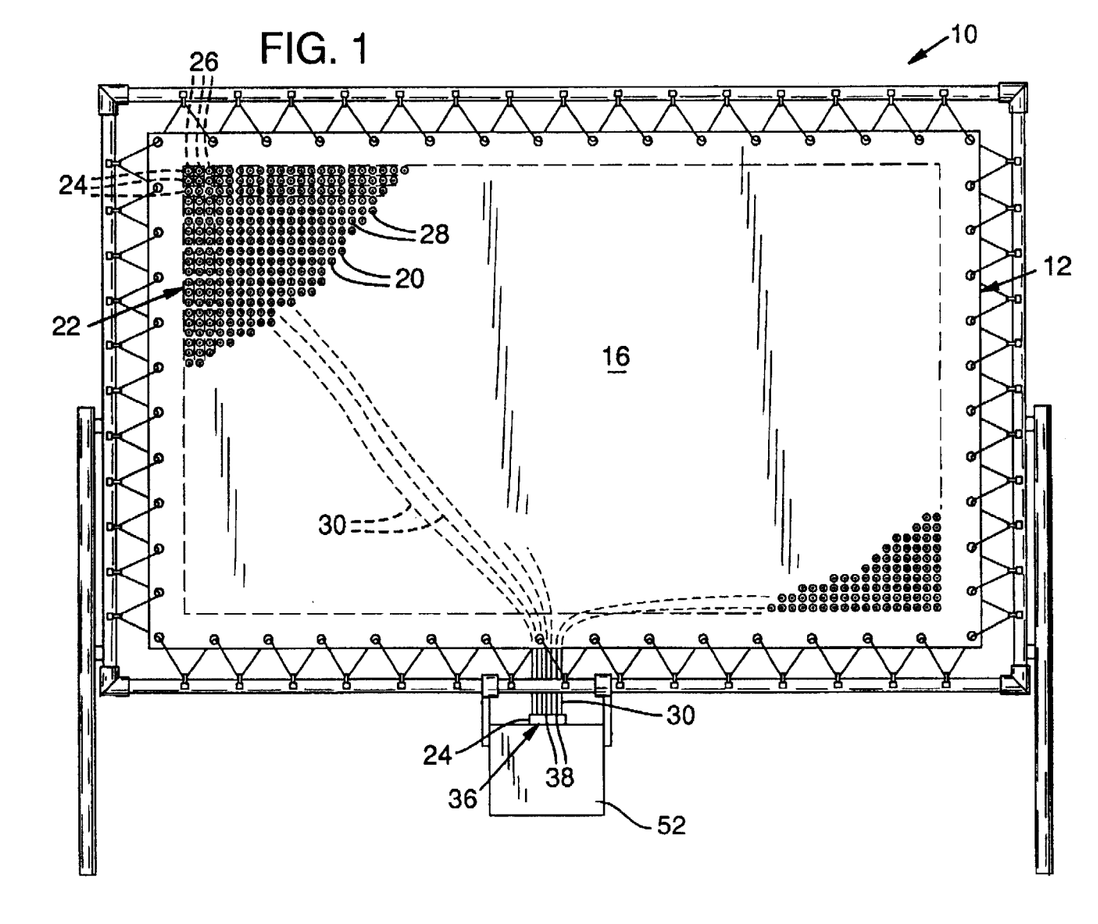
FIG. 1 is a simplified front elevation view of a fiber-optic matrix display system.

With reference to FIG. 1, a conventional fiber-optic matrix display system 10 includes one or more display screens 12. Display screen 12 is preferably 2.5–60 m² and

3 includes a flexible, durable substrate 16 of 200–670 g/m² polyester knit fabric, such as Advertex Lite™ made by Snyder Manufacturing Co. The fabric is preferably coated with vinyl, urethane, or the like to environmentally and dimensionally stabilize the knit as well as provide a surface suitable for bonding adhesive layers 18 (FIG. 12) and terminal housings 20. Although a black substrate 16 provides maximum visual performance of display screen 12, other colors may be employed as dictated by aesthetic considerations.

Display screen 12 also preferably includes a rectangular display matrix 22 of spaced-apart rows 24 and columns 26 of output terminals 28 of optical conductors 30 (of which only a limited number are shown partly in phantom). Output terminals 28 are mutually spaced apart by a distance of typically 25–130 mm across the surface of substrate 16. The distance between output terminals 28 substantially determines the resolution of a display image emitted from display screen 12. Skilled persons will appreciate that smaller distances between output terminals 28 increase the labor and material costs associated with adding more terminal housings 20 to display screen 12.

Optical conductors 30 preferably comprise long and thin waveguides such as 0.75–1.5 mm diameter, polymethylmethacrylate optical fibers having a fluorinated polymer cladding and exhibiting fairly low losses of around 0.17 dB/m.

Figure 2:
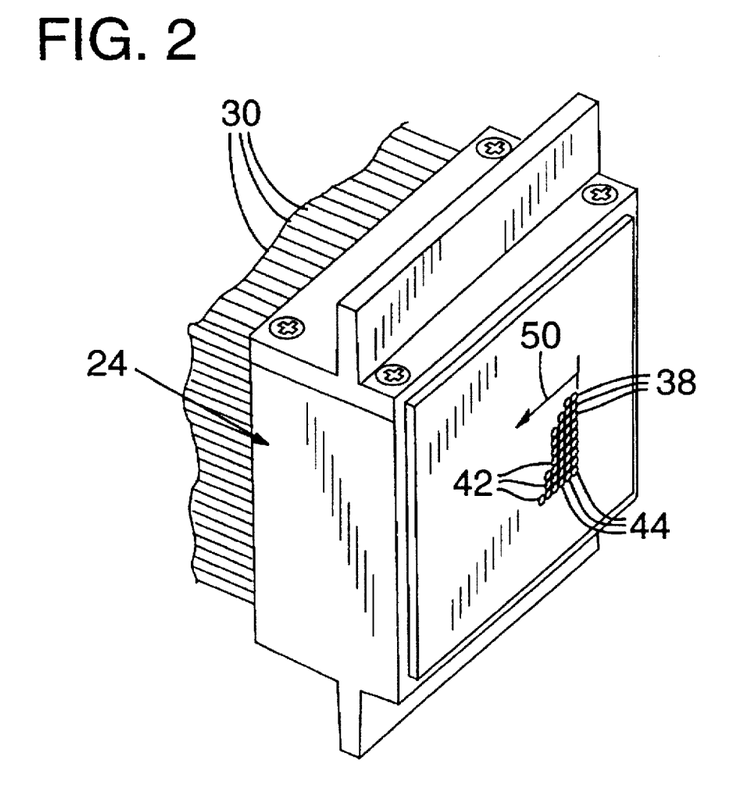
FIG. 2 is an isometric view of an input matrix.

Optical conductors 30 lie substantially flat against or run substantially parallel to rear surface 32 (FIG. 12) of substrate 16 and are collated into a launch grid 24 containing an input matrix 36 of an array of input terminals 38 (FIG. 2). Optical conductors 30 connect input matrix 36 to display matrix 14 in a prescribed pattern and provide for the transmission of light from input matrix 36 to display matrix 22. Input terminals 38 are separately connected on a one-to-one basis by optical conductors 30 to corresponding output terminals 28. In addition, the relative locations of input terminals 38 in input matrix 36 are geometrically similar to the relative locations of output terminals 28 in display matrix 22.

Figure 3:
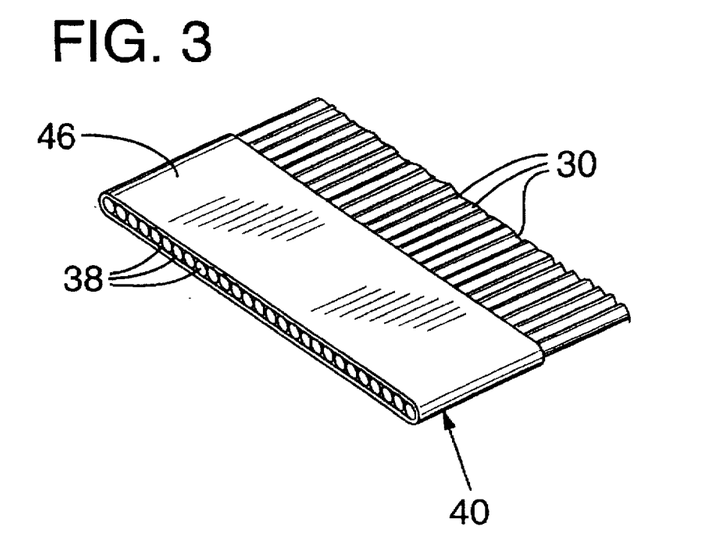
FIG. 3 is a fragmentary isometric view of an input matrix ribbon comprising a row or column of input terminals wrapped in a strip of heat-conductive tape.

FIG. 2 shows input matrix 36, and FIG. 3 shows one of its component ribbons 40. With reference to FIGS. 1–3, the arrangement of input terminals 38 in input matrix 36 exactly duplicates the arrangement of output terminals 28 in display matrix 22. Preferably, input terminals 38 of optical conductors 30 are first gathered into individual rows 42 or columns 44 to form short 51–155 mm ribbons 40. Ribbons 40 typically include an entire row 42 or column 44 of adjacent and contacting input terminals 38 fixed into position by a single layer of heat conductive tape 46. Such heat-conductive tape 46 may be, for example, 0.075–0.125 mm thick, 50–100 mm wide strips of adhesive-backed aluminum foil. Thicker tapes can be employed but could increase the interstitial gaps between the assembled row or column ribbons 40 and might create optical losses or geometric distortion.

With reference to FIG. 2, the input matrix 26 preferably constitutes a plane 50 and receives an optical source image from a projector 52 (FIG. 1) employing an illuminator system and an imaging medium (not shown). The imaging medium is positioned between the illuminator system and input matrix 36 and may include, for example, film transparencies, motion picture film, or transmissive light-valve devices such as liquid crystal displays. A preferred illuminator system is described in U.S. Pat. No. 5,428,365 of Harris et al., issued Jun. 27, 1995, which is herein incorporated by reference.

4

Figures 4, 5, 7, 8, 9:
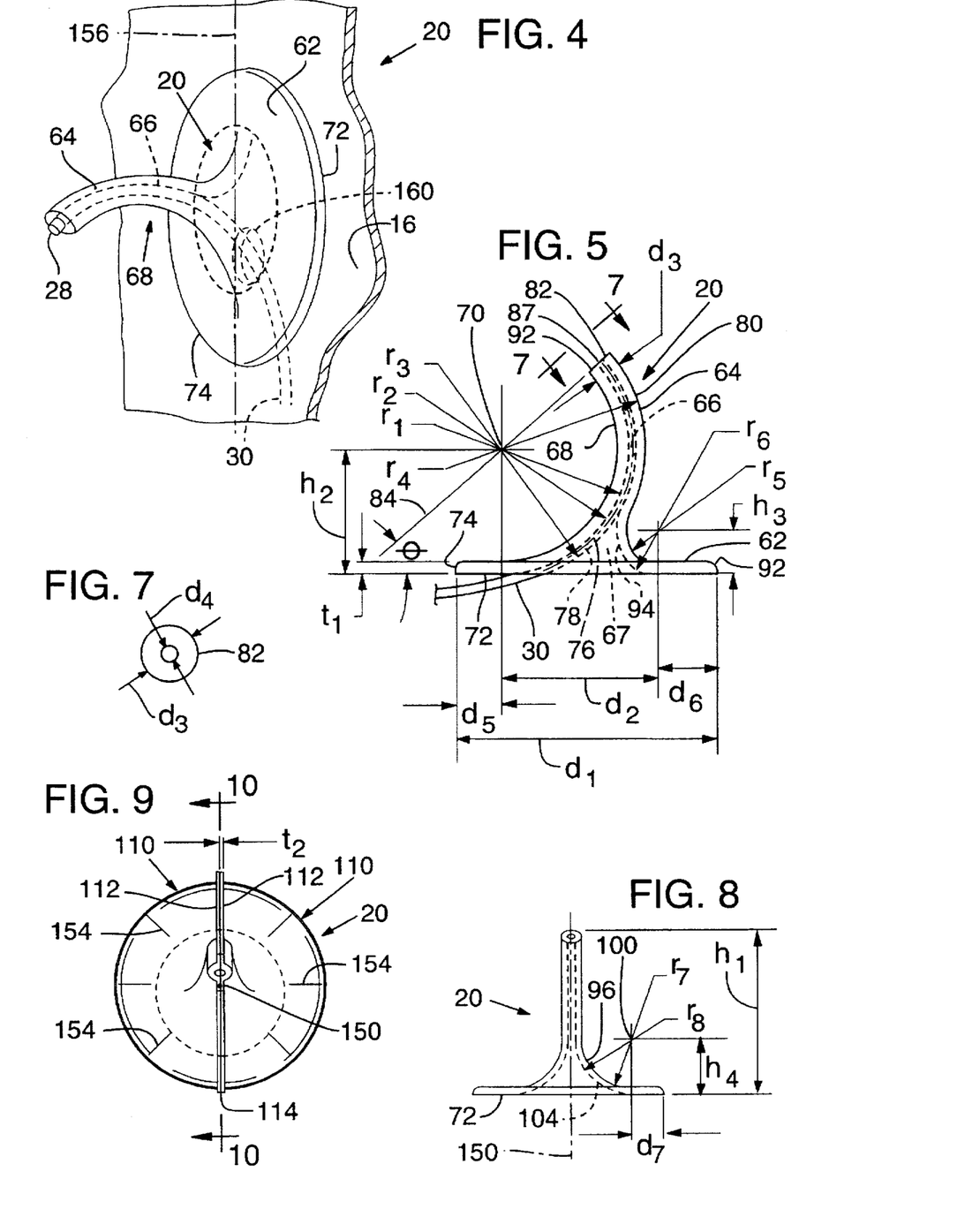
FIG. 4 is an enlarged isometric view of a terminal housing of the present invention.
FIG. 5 is a side elevation view showing curvature of a tubular neck of a terminal housing.
FIG. 7 is an auxiliary view of the terminal housing from a perspective direction 7—7 of FIG. 5.
FIG. 8 is a front elevation view of the terminal housing shown in FIG. 5.
FIG. 9 is a plan view of a two-piece "clam shell" variation of the terminal housing shown in FIG. 5.

FIG. 4 shows a preferred embodiment of a terminal housing 20 that provides a means for anchoring output terminals 28 of optical conductors 30 at desired locations on substrate 16 of display screen 12, provides a means for orienting the optical output of each output terminal 28 along a desired viewing axis, and provides a bend radius-limiting means to prevent optical conductors 30 from kinking or exceeding a critical bend radius that would seriously compromise the optical performance of optical conductors 30. These general features of a terminal housing 20 are described in U.S. Pat. No. 5,532,711 of Laura Harris, issued Jul. 2, 1996, which is herein incorporated by reference.

Terminal housings 20 are also lightweight and sufficiently strong and durable to maintain directional accuracy of output terminals 28 and to endure environmental forces such as icing or severe wind. Material thickness throughout a terminal housing 20 may vary, being thinner in areas experiencing tension and compression and thicker in areas experiencing shearing forces.

Figure 6:
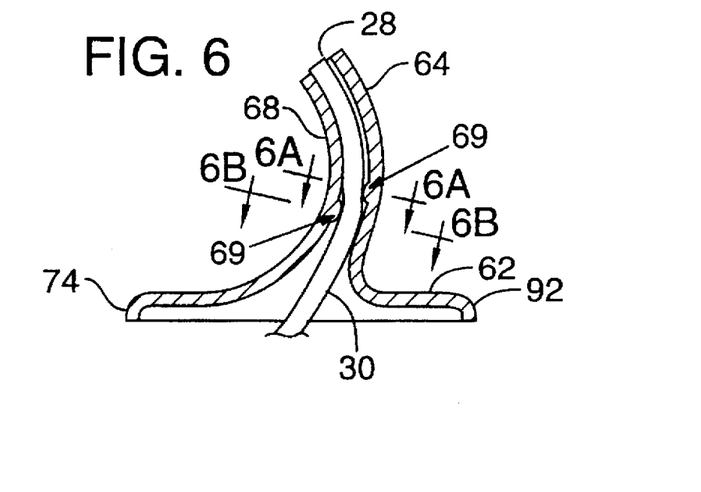
FIG. 6 is a cross-sectional view of an embodiment of FIG. 5 that includes friction bumps for securing an optical conductor.
Figure 6A:
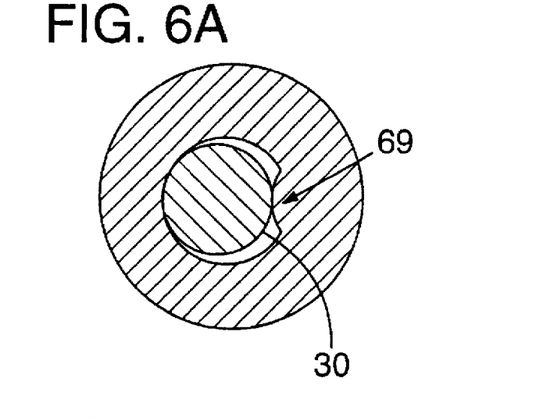
FIGS. 6A and 6B are cross-sectional views of an embodiment of FIG. 5 taken along section lines 6A—6A and 6B—6B of FIG. 6, respectively.
Figure 6B:
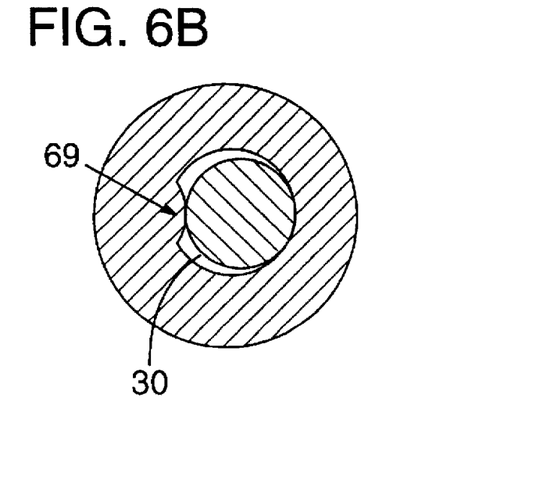

FIG. 5 is a side elevation view showing the curvature of a tubular neck 64 of a preferred embodiment of terminal housing 20 of the present invention; FIGS. 6, 6A, and 65 are cross-sectional views of optional friction bumps positioned within terminal housing 20; FIG. 7 is an auxiliary view of the terminal housing from a perspective direction 7—7 of FIG. 5; and FIG. 8 is a front elevation view of the terminal housing shown in FIG. 5. With reference to FIGS. 5–8, terminal housing 20 preferably includes a flat, circular base 62, tapering to a funnel portion 60 and tubular neck 64 with changing angular displacement to form an arcuate channel 66 that is adapted to support optical conductor 30. Base 64 has an entry position 67 for channel 66 that is adapted to receive optical conductor 30. Skilled persons will appreciate that base 64 may be any type of substrate connection feature, such as a grommet.

In one preferred embodiment, base 62 has a diameter $d_1$ of 38.1 mm and a thickness $t_1$ of 1.6 mm; funnel portion 60 has a diameter $d_2$ of 22.9 mm; tubular neck 64 has a diameter $d_3$ of 9.3 mm; and channel 66 has a diameter $d_4$ that nearly matches the diameter of optical conductor 30 for a snug fit, e.g., 1 mm.

Alternatively, with reference to FIG. 6, channel 66 may have a diameter $d_4$ slightly larger, e.g., 0.15–0.25 mm larger, than the diameter of optical conductor 30 to facilitate placing it into channel 66. In most cases, a 15% diameter difference is preferred. Whenever a significant diameter difference is desirable, terminal housing 20 is preferably adapted to include one or more internal friction bumps or pads 69 within funnel portion 60 to prevent optical conductor 30 from extending too far beyond distal position 87 of terminal housing 20. In FIG. 6, a pair of proximal friction bumps 69 is positioned on opposing internal surfaces of the front 76 and back 94 of channel 66. Skilled persons will appreciate that friction pads 69 can be positioned higher or lower within channel 66 or on the same side of channel 66. Similarly, a bump 79 on front 76 can be positioned higher in channel 66 than a friction bump 79 on back 94. More than two friction bumps 79 can be employed.

A minimum height $h_1$ of tubular neck 64 depends largely on the type, and particularly the diameter, of optical conductor 30. Because the curve radius is preferably at least about 10 times the diameter of the preferred optical conductor 30, the height of tubular neck 64 as well as $d_4$ of channel 66 may be selected to accommodate a specific diameter of optical conductor 30. In the embodiment shown in FIG. 8, $h_1$ is about 32.1 mm.

With reference again to the preferred embodiment in FIG. 5, front 68 of tubular neck 64 has generally circular curvature with respect to a focus 70 that is positioned at a height $h_2$ of 18.5 mm from bottom 72 of base 62 and at a distance $d_5$ of 6.4 mm from front 74 of base 62. With respect to focus 70, radius $r_1$ has a value of 16.9 mm to front 68 of tubular neck 64; radius $r_2$ has a value of 18.5 mm to front 76 of channel 66; radius $r_3$ has a value of 19.1 mm to center 78 of optical conductor 30; and radius $r_4$ has a value of 21.2 mm to back 80 of tubular neck 64. Top 82 of tubular neck 64 is flush with a radius line 84 having an angle $\theta$ of 40° with respect to plane 86 (of substrate 16 or) of bottom 72 of base 62. Top 82 includes distal position 87 of channel 66.

Back 88 of tubular neck 64 at funnel portion 60 also has generally circular curvature with respect to a focus 90 that is positioned at a height $h_3$ of 6.4 mm from bottom 72 of base 62 and at a distance $d_6$ of 8.9 mm from back 92 of base 62. With respect to focus 90, radius $r_5$ has a value of 4.7 mm to back 88 of tubular neck 64 at funnel portion 60 and radius $r_6$ has a value of 4.4 mm to back 94 of channel 66 at funnel portion 60.

With reference to FIG. 8, side 96 of tubular neck 64 at funnel portion 60 also has generally circular curvature with respect to a focus 100 that is positioned at a height $h_4$ of 10.9 mm from bottom 72 of base 62 at a distance $d_7$ of 6.4 mm from side 102 of base 62. With respect to focus 100, radius $r_7$ has a value of 9.3 mm to side 96 of tubular neck 64 at funnel portion 60, and radius $r_7$ has a value of 10.9 mm to side 104 of channel 66 at funnel portion 60.

Figures 10, 12:
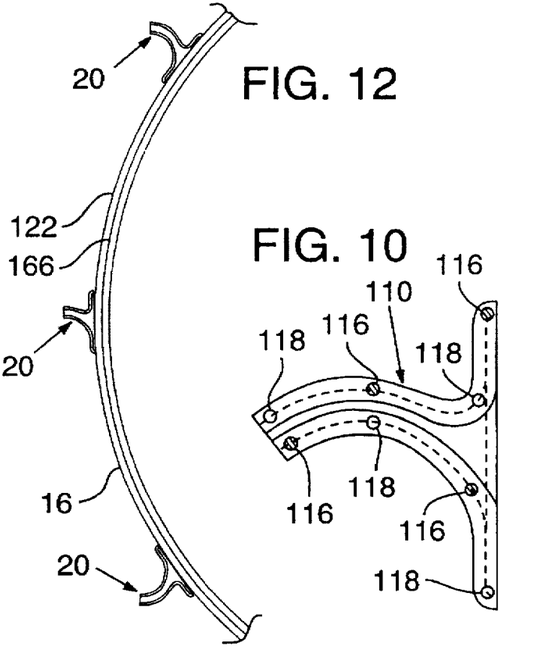
FIG. 10 is a side view of a half-housing piece taken along lines 10—10 of FIG. 9.
FIG. 12 is a fragmentary side elevation view showing output terminals whose necks have orientations that compensate for a curved display screen.

FIG. 9 is a plan view of a two-piece "clam shell" variation of the terminal housing shown in FIG. 5, and FIG. 10 is a side view of a half-housing piece taken along lines 10—10 of FIG. 9. With reference to FIGS. 9 and 10, terminal housing 20 is preferably manufactured as half-housing pieces 110 that are generally side-to-side mirror images of each other. Skilled persons will appreciate, however, that housing pieces may alternatively be formed in front-back, pie-wedge, or multiple-piece combinations. The embodiment in FIG. 9 also shows ridges 112 along a bisection or joining line 114. Ridges 112 have a thickness $t_2$ of 0.76 mm.

With reference to FIG. 10, in a preferred embodiment, mated half-housing pieces 110 also include opposing alignment pegs 116 and mating holes 118 to facilitate proper joining of half-housing pieces 110. Persons skilled in the art will appreciate that alignment pegs 116 and mating holes 118 may be configured to captively "snap" half-housing pieces 110 together to provide a secure attachment. The resulting terminal housing 20 is preferably ultrasonically welded together in a chamber adapted to the shape of terminal housing 20. Additionally or alternatively, an adhesive may be used to hold half-housing pieces 110 together.

Terminal housings 20 or half-housing pieces 110 are preferably formed in an injection molding process from a lightweight elastomer having a durometer hardness of 72–75 Shore D. Preferred elastomers include an elastomer of acrylonitrile butadiene styrene and polyamide alloy, Triax™ 1120 (dry), manufactured by Monsanto Company; a thermoplastic elastomer, Hytrel™ 7246, manufactured by DuPont Engineering Polymers; an elastomer alloy of polyurethane and polycarbonate, Texin™, manufactured by Bayer; and ABS. The elastomer preferably is, or is dyed, black or grey to maximize absorption of ambient light.

Figure 11:
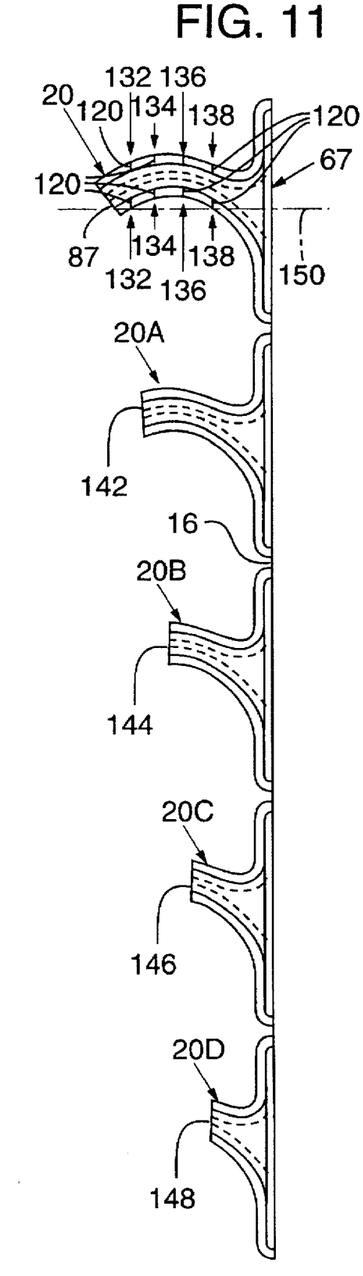
FIG. 11 is a side elevation view of a terminal housing having preformed alignment marks and terminal housings with their tubular necks cut at medial positions corresponding to certain of the alignment marks.

FIG. 11 is a side elevation view of a terminal housing 20 having preformed severing alignment marks 120 and four terminal housings 20A, 20B, 20C, and 20D with their tubular necks severed along certain of the alignment marks 120. FIG. 12 is a fragmentary side elevation view showing output terminals whose necks have angular output orientations that compensate for curvature of display screen 122.

With reference to FIGS. 11 and 12, whenever the viewing axis for certain output terminals 28 is not 90° from the surface of display screen 12, such as whenever it is wrapped onto an angled, curved, or nonplanar support surface 124, tubular necks 64 of terminal housings 20 are constructed or severed so that they orient output terminals 28 to compensate for the curvature of surface 124. Thus, output terminals 28 are oriented at an equal but opposite angular displacement to the curvature of surface 124 to provide a cohesive and substantially uniformly bright expanded display image for viewing by a distant observer. Surface 124 may be, for example, the outer envelope of an airship, a curved or angled wall or building surface, or even a flat surface disposed at an angle undesirable for perpendicular viewing.

With reference to FIG. 11, terminal housing 20 has multiple preformed severing alignment marks 120 at medial positions 132, 134, 136, and 138 that correspond to known angular output orientations with respect to substrate or base plane 86. For example, if the substrate plane 86 is given a reference value of 0° at front 74 of base 62 and a reference value of 180° at back 92 of base 62, then medial positions 132, 134, 136, and 138 as shown in FIG. 11 would correspond approximately to angular output orientations of 85°, 90°, 120°, and 125°. Similarly, the distal position 87 of channel 66 or tubular neck 64 would have an angular output orientation of 60°.

Terminal housings 20A, 20B, 20C, and 20D show examples of terminal housings 20 cut along severing alignment marks 120 at respective medial positions 132, 134, 136, and 138 to form respective output ends 142, 144, 146, and 148 with respective angular output orientations of 85°, 90°, 120°, and 125°. Skilled persons will appreciate, however, that severing alignment marks are not required to cut channel 66 to have a desired angular output orientation. Terminal housings 20 may be cut "free-form" with the aid of a protractor or may be placed in a cutting device adapted to hold the terminal housings 20 in a specified position and configured with severing settings that correspond to desired angular output orientations. When employed, alignment marks 120 are, however, preferably positioned to designate angular output orientations in increments of 5°. Furthermore, alignment marks 120 may be indentations or ridges on front, back, or sides of tubular neck 64 or channel 66 or may completely encircle them.

Skilled persons will also appreciate that tubular necks 64 may be constructed to cover all of the angular output orientations between 0° and 180°. However, with reference to FIGS. 9 and 11, terminal housings 20 may be rotated about a central axis 150 such that tubular necks are preferably constructed to provide angular output orientations in only a 0° through 90° range, and most preferably in a 40° through 90° range. Top 152 of base 62 may be provided with clocking marks 154 at angular increments of, for example, 15° around central axis 150. Some of clocking marks 154 have been omitted from FIG. 9 for clarity. Clocking marks 154 facilitate positioning of front 74 of base 62 with respect to positioning axis 156 in substrate plane 86. Therefore, terminal housing 20 could be rotated 180° around central axis 150 to provide an angular output orientation of 55°, and distal end 87 of terminal housing 20 in FIG. 11 has the same effective angular output orientation as output end 146 of terminal housing 20C. Thus, terminal housings 20 that provide angular output orientations of 0° through 90° can accommodate any desirable angular output orientation and therefore can be oriented to offset any slant or complex or compound curvature of support surface 124. For example, support surface 124 may be planar but have a tilt of 15° off of a vertical plane, and terminal housings 20 may be severed to have a 75° angular output orientation and rotated into a position to compensate for the slant. Alternatively, an off-axis viewing angle may be added to a vertical screen, such as directing the output ends at a downward angle from a vertical screen placed on a side of a tall building.

A person skilled in the art will appreciate that display screen 12 preferably employs only one type or material of terminal housing 20 to simplify manufacture, but any particular display screen 12 may employ a variety of materials or types of terminal housings 20 particularly suited to the intended use and location of display system 10. Furthermore, an assortment of terminal housings 20 may be prefabricated with distal positions 87 at a variety of angular output orientations, such as 90°, or other angles heavily used for particular support surface curvatures or applications. Accordingly, an injection mold can be created to adjust the distal position of prefabricated terminal housings 20.

The output angle and hence the practical viewing angle may also be increased through a variety of refractive or diffractive techniques. For example, refractive techniques may include optical dispersion that may be implemented by thermally or mechanically "roughening" or contouring each output terminal 28 to provide a lens- or prism-like shape. These techniques are described in U.S. Pat. No. 5,532,711.

Figure 13:
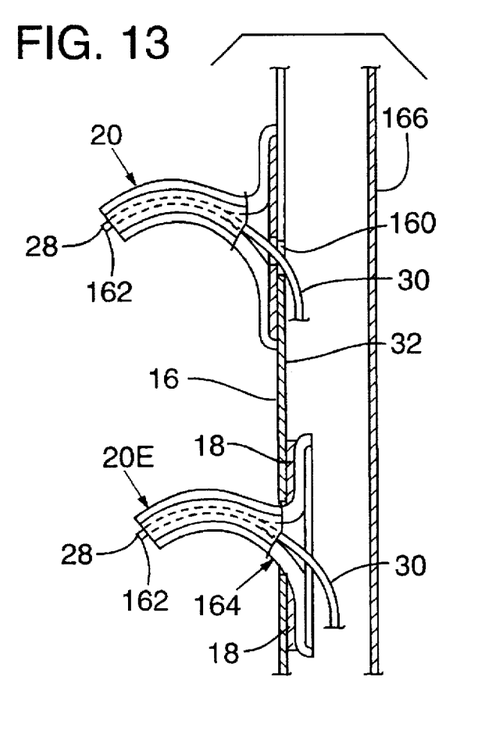
FIG. 13 is a fragmentary cross-sectional view showing two alternative embodiments of terminal housings affixed to a common substrate of a display screen of the present invention.

With reference to terminal housings 20 shown in FIG. 13, optical conductors 30 are run along rear surface 32 of substrate 16 and passed through small holes 160 (FIG. 4) formed in substrate 16 at the desired locations in display matrix 22. Optical conductors 30 pass through bases 62, run along funnel portions 60, pass through channels 66, and preferably extend about 1–6 mm beyond tubular necks 64. Channels 66 guide optical conductors 30 and orient output terminals 28 toward a desired viewing angle. Optical conductors 30 are either cemented in place or mechanically fixed by thermally flaring each output terminal 28 to form a slight flange 162, as shown in FIG. 13, to prevent output terminals 28 from slipping back through tubular necks 64 of terminal housings 20.

FIG. 13 shows two preferred methods for connecting terminal housings 20 to substrate 16 and optical conductors 30. Terminal housings 20 are preferably attached to substrate 16 with adhesive layers 18. Both the terminal housing material and the substrate surface preferably exhibit relatively high surface energies for promoting uniform adhesive flow across the bonded surfaces and enhancing adhesive performance and bond strength. The preferred elastomeric plastics have a fairly high surface energy. A preferred adhesive system employs ring-shaped pieces of double-sided adhesive tape such as VHB, manufactured by the 3M Corporation, which tape has an acrylic-based adhesive affixed to both sides of a thin foam substrate.

Terminal housing 20E presents a preferred embodiment of a rear mounting technique for supporting output terminals 28 on substrate 16 of display screen 12. Terminal housing 20E may have a larger diameter base 62 whose front or upper surface is affixed via adhesive layer 18 to the rear surface 32 of substrate 16. Tubular neck 64 of terminal housing 20E protrudes through a larger hole 164 in substrate 16. Although adhesive layers tend to strengthen the integrity of some substrates 16, larger holes tend to weaken fabrics more than smaller holes because more threads in the knit are cut. The rear mounting technique may, however, be advantageous whenever display screen 12 is fitted against a rigid surface in an area subject to unusually high environmental forces. It will be appreciated that a variety of lightweight and durable fastening techniques such as thermal or ultrasonic "welding" can be carried out without departing from the scope of the present invention.

A flexible protective cover 166, positioned coplanar but separated from rear surface 32 of substrate 16 by a small distance greater than curve radius $r_1$, cooperates with terminal housings 20 to prevent excessive bending and kinking of optical conductors 30. Optical conductors 30 are preferably supported by or fixed to protective cover 166 to reduce vertical loading. Protective cover 166 may, for example, be a lightweight nylon netting to which optical conductors 30 are tied. A netting mesh facilitates access to the back of display screen 12, thereby eliminating the need to remove protective cover 166 for repairs. Soft, pliable, and durable netting having mesh openings of about 25 $mm^2$ that are sufficiently large to provide access for repairs is preferred. For some applications, stiffer and more stable polypropylene netting may be employed. Alternatively, lightweight ripstop-type nylon fabrics or polyester (Dacron), such as Stits-Light 1 manufactured by Stits Aircraft Company, are also suitable for use as protective cover 166. Such fabrics offer complete protection for optical conductors 30 but provide limited access for repairs.

Protective cover 166 is preferably attached to rear surface 32 of substrate 16 by stitching, adhesive, or numerous small ties. Small ties are preferred with netting, and adhesive is preferred with fabric. Protective cover 166 protects optical conductors 30 from damage and snagging and protects any surface 120 (FIG. 12) on which the display screen 12 is wrapped from damage by optical conductors 30.

Figure 14:
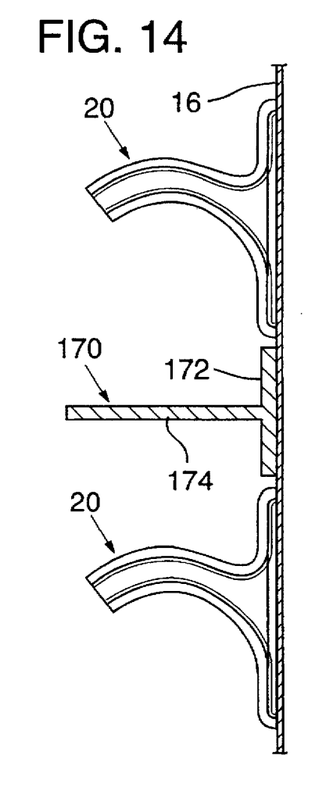
FIG. 14 is a fragmentary side elevation view of a louver positioned between rows of terminal housings.
Figure 15:
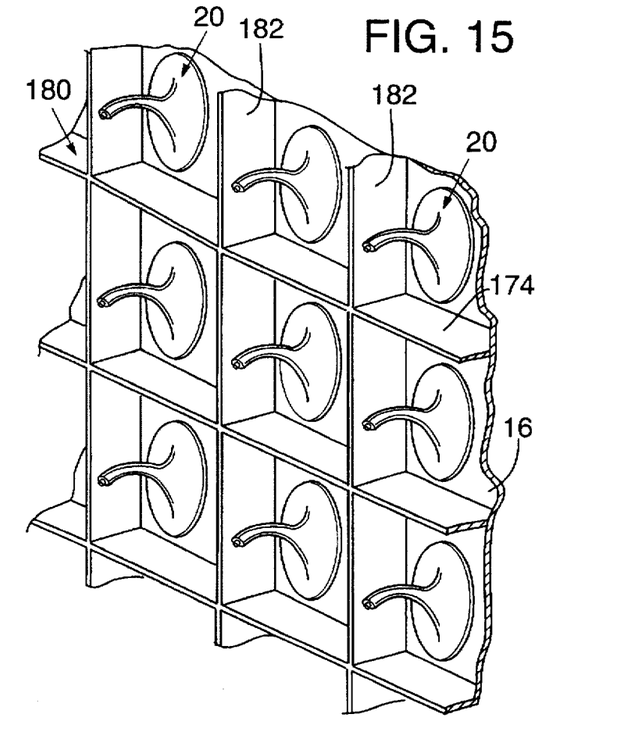
FIG. 15 is a fragmentary isometric view of a lattice shade positioned between rows and columns of terminal housings.
Figure 16:
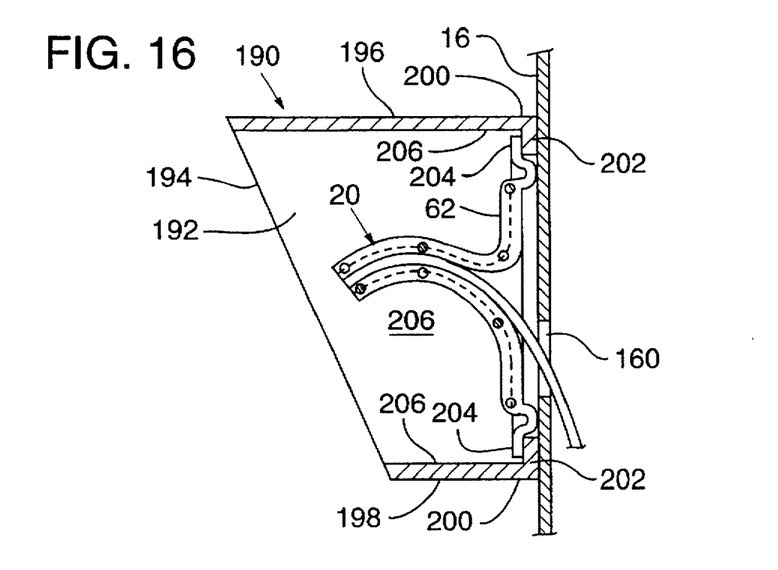
FIG. 16 is a sectional view of a variable monterminal shade supported against a display screen by an alternative terminal housing base.

FIGS. 14–16 show alternative embodiments of louvers that may be added to display screens 12 that are used significantly during daylight hours or in locations having bright ambient light. With reference to FIG. 14, a horizontal louver 170 has its base 172 affixed directly or indirectly to substrate 16 of display screen 12 in much the same manner that terminal housings 20 and 20E are attached to substrate 16. Hooks and loops Velcro™, snaps, or other techniques may be employed if removable louvers 170 are desired. Shading slats 174 may be perpendicular to base 172 as shown or angled desirably to block ambient light from striking output terminals 28. Louvers 170 may be formed as a single piece that extends all the way across display screen 12 or may be formed in segments and placed selectively within display matrix 22. Skilled persons will appreciate that a completely detachable venetian blind-type louvers with adjustably pivotal slats 174 and rear spacers to maintain the slats at an appropriate distance in front of output terminals 28 may alternatively be employed.

With reference to FIG. 15, a lattice louver 180 is positioned between rows 24 and columns 26 of terminal housings 20. Lattice louver 180 includes both horizontal slats 174 and vertical slats 182 that are preferably formed in square or rectangular subunits that may be attached to substrate 16 as previously described.

FIG. 16 shows a variable monoterminal shade 190 having a cylindrical wall 192 that preferably has tapering wall top 194 between a high rear section 196 and a short front section 198. Wall bottom 200 is attached to a ring flange 202 that may be Secured against substrate 16 by an overhanging flange 204 of base 62. Cylindrical wall 192 preferably has a diameter well-matched to the diameter of base 62. Alternatively, cylindrical wall 192 may have a larger diameter and a wider ring flange 202. Either ring flange 202 or inside surface 206 of wall 192 may include clocking marks that may be used in conjunction with clocking marks 154 to facilitate desirable rotational orientation of rear and front sections 196 and 198 with respect to base 62 and positioning axis 156. Skilled persons will appreciate that the rotational orientations of terminal housings 20 and shades 190 may be established independently. The source and direction of ambient light and curvature of display screen 12 will largely determine the rotational orientation of shade 190.

Skilled persons will also appreciate that there are numerous ways shades 190 may be connected to terminal housings 20 or substrate 16. For example, base 62 may contain a groove to support shade 190 away from substrate 16, or ring flange 202 of shade 190 may contain a groove adapted to receive overhang flange 204 of base 62. The height and taper of top 194 of shade 190 is also selected to not interfere with the off axis viewing angle of the output terminals 28 in display matrix 22. Furthermore, shades 190 and louvers 170 and 180 are preferably fabricated from a lightweight material and have dark or black color to prevent reflection.

It will be obvious to those having skill in the art that various changes may be made in the details of the above-described embodiments of the present invention without departing from the underlying principles thereof. For example, channels 66 may be adapted to house multiple optical conductors 30. The scope of the present invention should be determined, therefore, only by the following claims.

I claim:

1. A terminal housing for supporting an output terminal of an optical conductor, comprising:

a neck having a base and a top;

an arcuate optical conductor support channel within the neck, the channel having changing angular displacement between an entry position at the base and a distal position at the top; and a medial position corresponding to a predetermined angular output orientation with respect to the base such that severing the channel at the medial position forms an output end of the channel at the medial position such that the output end is adapted for orienting the output terminal of the optical conductor in a predetermined output angular orientation.

2. The terminal housing of claim 1 in which the base has a substrate plane transverse to the entry position and the predetermined angular output orientation falls between 0° and 180° with respect to the substrate plane of the base.

3. The terminal housing of claim 1 in which the base has a substrate plane transverse to the entry position and the predetermined angular output orientation falls between 40° and 90° with respect to the substrate plane of the base.

4. The terminal housing of claim 1 further comprising: preformed severing alignment marks on the neck that correspond to respective angular output orientations.

5. The terminal housing of claim 4 in which the base has a substrate plane of 0° and the alignment marks correspond to angular output orientations in angular degrees with respect to the substrate plane.

6. The terminal housing of claim 1 in which the base comprises a front, back, and an upper surface, the terminal housing further comprising:

a positioning axis between the front and back; and preformed clocking marks on the upper surface of the base, the clocking marks corresponding to angular degrees of rotation with respect to the positioning axis.

7. The terminal housing of claim 1 in which the base forms part of a detachable ferrule.

8. The terminal housing of claim 1 in which the base comprises a predominantly flat bottom surface.

9. The terminal housing of claim 1 in which the channel has a radius of curvature.

10. The terminal housing of claim 1 further comprising an elastomeric material.

11. The terminal housing of claim 1 formed by injection molding.

12. The terminal housing of claim 10 in which the material comprises a durometer hardness of 72–75 Shore D.

13. The terminal housing of claim 1 in which the neck is formed from at least two preformed pieces that cooperate to make the support channel tubular.

14. The terminal housing of claim 1 in which the support channel is tubular.

15. The terminal housing of claim 13 further comprising two generally symmetrical half-housing pieces.

16. The terminal housing of claim 13 in which the pieces have mated alignment pegs and holes.

17. The terminal housing of claim 16 in which the pegs and holes snap together to hold the pieces together.

18. The terminal housing of claim 1 connected to a substrate comprising a matrix of additional terminal housings.

19. The terminal housing of claim 18 in which the substrate is positioned in a nonvertical plane.

20. The terminal housing of claim 1 in which the channel has an internal diameter and is adapted to an optical conductor having a significantly smaller diameter, further comprising:

at least a first friction bump positioned within the channel to secure the optical conductor from easily sliding within the channel.

21. The terminal housing of claim 20, further comprising:

a second friction bump positioned on an opposing internal wall surface within the channel.

* * * * *